US012572567B2

(12) United States Patent
Subber et al.

(10) Patent No.: US 12,572,567 B2
(45) Date of Patent: Mar. 10, 2026

(54) SYSTEMS AND METHODS FOR CONSTRUCTING A CLASSIFICATION MODEL USING DATA ASSOCIATED WITH A FACILITY

(71) Applicant: Honeywell International Inc., Charlotte, NC (US)

(72) Inventors: Waad Subber, Schenectady, NY (US); Ankit Singh, Apex, NC (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 18/822,520

(22) Filed: Sep. 3, 2024

(65) Prior Publication Data

US 2026/0064719 A1    Mar. 5, 2026

(51) Int. Cl.
*G06F 16/28*        (2019.01)
*G06N 20/00*        (2019.01)

(52) U.S. Cl.
CPC ........... *G06F 16/285* (2019.01); *G06N 20/00* (2019.01)

(58) Field of Classification Search
CPC .............................. G06F 16/285; G06N 20/00
See application file for complete search history.

(56) References Cited

U.S. PATENT DOCUMENTS

| | | | | |
|---|---|---|---|---|
| 7,765,212 | B2 * | 7/2010 | Surendran ............ | G06Q 10/107 |
| | | | | 707/738 |
| 11,960,554 | B2 * | 4/2024 | Prasad ................ | G06F 16/9038 |
| 2005/0165813 | A1 * | 7/2005 | Krasney ................ | G09B 19/00 |
| 2018/0173699 | A1 * | 6/2018 | Tacchi .................. | G06F 16/358 |
| 2019/0110754 | A1 * | 4/2019 | Rao .......................... | G06N 7/00 |
| 2019/0295110 | A1 * | 9/2019 | Bessen .................. | G06N 20/00 |
| 2021/0224306 | A1 * | 7/2021 | Choudhary ........ | G06Q 30/0281 |
| 2021/0264116 | A1 * | 8/2021 | Thor ........................ | G06F 40/30 |
| 2021/0312330 | A1 * | 10/2021 | De Vries ................ | G16H 50/70 |
| 2024/0126796 | A1 * | 4/2024 | Mathur .................. | G06N 20/00 |
| 2024/0177183 | A1 * | 5/2024 | Miguel .................. | G06F 40/30 |

* cited by examiner

*Primary Examiner* — Etienne P Leroux

(57) ABSTRACT

Various embodiments described herein relate to systems and methods for constructing a classification model using data associated with a facility. In this regard, unlabeled data associated with the facility is retrieved. Based on an application of a first algorithm on the unlabeled data, parameters in the unlabeled data are determined. Using the parameters, machine learning algorithms identify topics and clusters in the unlabeled data. Also, a prioritized list of keywords is generated for each of the topics. Then, the prioritized list of keywords is input to a language learning model. The language learning model outputs a keyword from the list of keywords. If the keyword meets a predefined threshold, a cluster of the clusters is labeled using the keyword. Using first set of labeled clusters, the classification model is trained. The trained classification model provides recommendations related to the facility which are also renderable on a user interface as well.

20 Claims, 9 Drawing Sheets

400

500

```
prompt_template = """

As a linguistic specialist in life sciences, your expertise is crucial in analyzing a list of keywords extracted from a set of documents
and assigning a single label to represent the overarching theme of the keywords.
You've been provided with a list of labels representing root causes, and your task is to select the most appropriate label for the entire list of keywords.

List of labels
- {labels}

List of keywords
- {keywords}

Based on your understanding of the life sciences domain and the relationships among the keywords, select the label that best encapsulates the essence of the entire list.
Provide a brief explanation to justify your choice, highlighting the key connections and insights that led to your decision.
Please don't include any specific keywords in your response.

Please provide your response in the following JSON format:

"label": "Selected label",
"explanation": "Brief explanation justifying the chosen label."

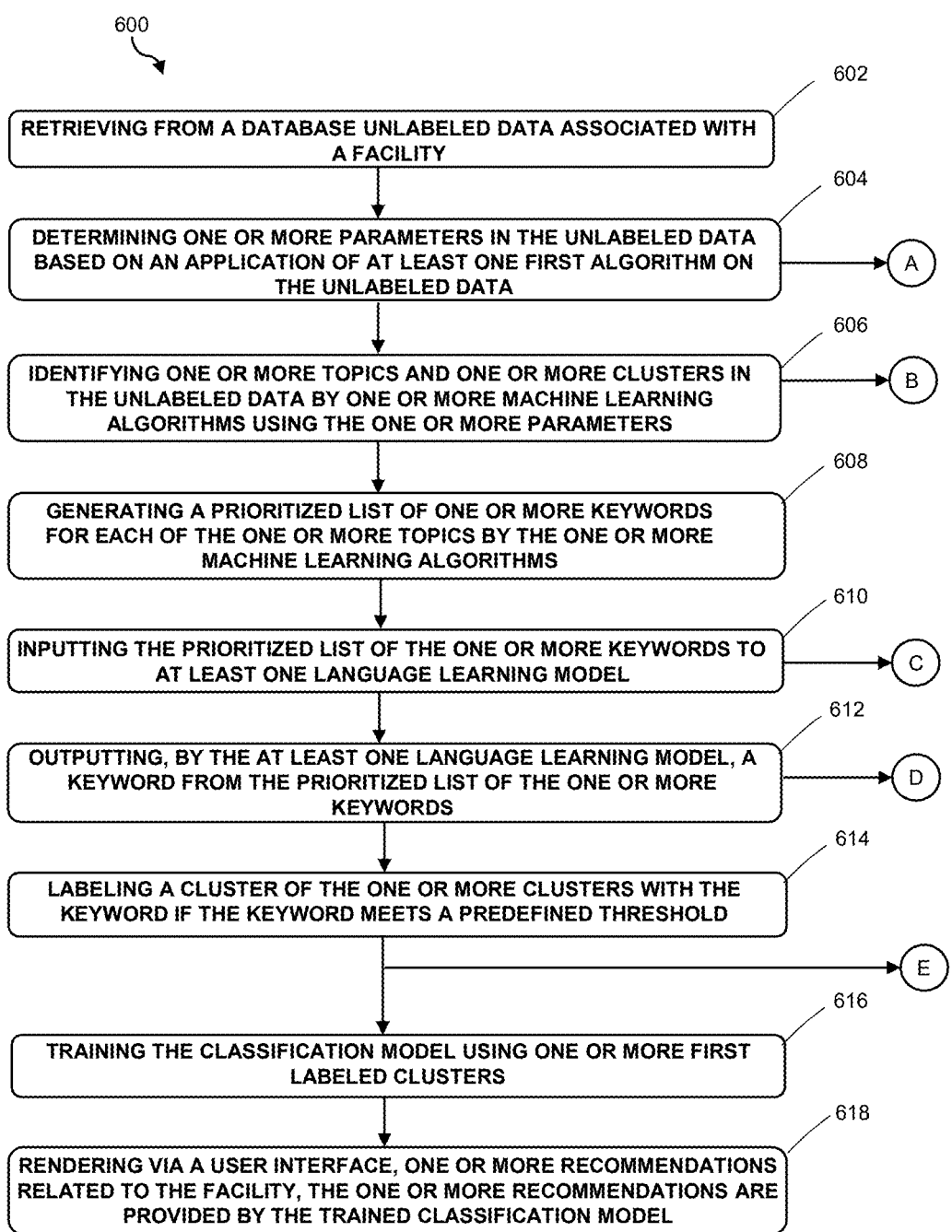

600

602
RETRIEVING FROM A DATABASE UNLABELED DATA ASSOCIATED WITH A FACILITY

604
DETERMINING ONE OR MORE PARAMETERS IN THE UNLABELED DATA BASED ON AN APPLICATION OF AT LEAST ONE FIRST ALGORITHM ON THE UNLABELED DATA          A

606
IDENTIFYING ONE OR MORE TOPICS AND ONE OR MORE CLUSTERS IN THE UNLABELED DATA BY ONE OR MORE MACHINE LEARNING ALGORITHMS USING THE ONE OR MORE PARAMETERS          B

608
GENERATING A PRIORITIZED LIST OF ONE OR MORE KEYWORDS FOR EACH OF THE ONE OR MORE TOPICS BY THE ONE OR MORE MACHINE LEARNING ALGORITHMS

610
INPUTTING THE PRIORITIZED LIST OF THE ONE OR MORE KEYWORDS TO AT LEAST ONE LANGUAGE LEARNING MODEL          C

612
OUTPUTTING, BY THE AT LEAST ONE LANGUAGE LEARNING MODEL, A KEYWORD FROM THE PRIORITIZED LIST OF THE ONE OR MORE KEYWORDS          D

614
LABELING A CLUSTER OF THE ONE OR MORE CLUSTERS WITH THE KEYWORD IF THE KEYWORD MEETS A PREDEFINED THRESHOLD          E

616
TRAINING THE CLASSIFICATION MODEL USING ONE OR MORE FIRST LABELED CLUSTERS

618
RENDERING VIA A USER INTERFACE, ONE OR MORE RECOMMENDATIONS RELATED TO THE FACILITY, THE ONE OR MORE RECOMMENDATIONS ARE PROVIDED BY THE TRAINED CLASSIFICATION MODEL

FIG. 6

SYSTEMS AND METHODS FOR CONSTRUCTING A CLASSIFICATION MODEL USING DATA ASSOCIATED WITH A FACILITY

The present disclosure generally relates to a data management system. More particularly, the present disclosure relates to constructing a classification model by employing data associated with a facility.

BACKGROUND

Generally, a facility related to life sciences sector such as a pharmaceutical industry, a medical device company, a healthcare firm, and/or the like often handles vast amount of data to facilitate hassle free operations in the facility. This data may be generated across different domains or due to various functions within the facility. For example, the data may correspond to clinical notes generated out of examination process, health records of several patients, medical literature from journals and books, description of complaints received from customers associated with the facility, research findings from research and development in the facility, and/or the like. With advent of Machine Learning (ML) and/or Artificial Intelligence (AI) applications for data handling, the facility often relies on those applications to handle such amount of data associated with the facility. However, for such applications to appropriately handle the data, it is required to have classified or labeled data. For this, the facility often relies on several domain experts to manually annotate such data for generating labeled data for the ML and/or AI applications. Such manual work is often error prone as the experts may fail to accurately scale up to huge volume of data. Also, this is a time-consuming and costly process leading to inefficient usage of computing and human resources in the facility.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 5 illustrates a schematic diagram showing an exemplary user interface rendering one or more exemplary instruction prompts, in accordance with one or more example embodiments described herein.

FIG. 6 illustrates a flowchart showing a method described in accordance with one or more example embodiments described herein.

SUMMARY

Figure 1:
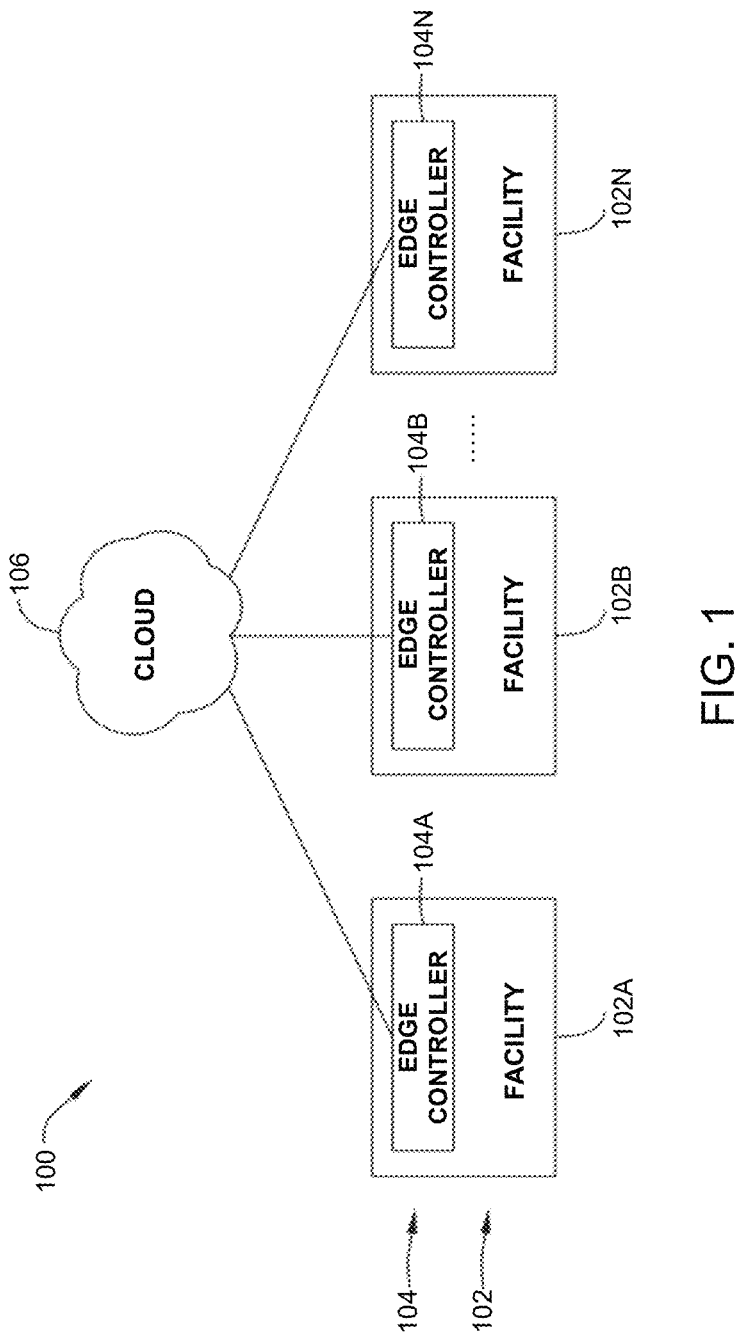
FIG. 1 illustrates a schematic diagram showing an exemplary environment comprising multiple facilities, in accordance with one or more example embodiments described herein.

The details of some embodiments of the subject matter described in this specification are set forth in the accompanying drawings and the description below. Other features, aspects, and advantages of the subject matter will become apparent from the description, the drawings, and the claims.

In accordance with one or more example embodiments of the current disclosure, a method for constructing a classification model using data associated with a facility is described herein. In this regard, the method comprises retrieving from a database unlabeled data associated with the facility. The method then comprises determining one or more parameters in the unlabeled data based on an application of at least one first algorithm on the unlabeled data. Further, the method comprises identifying one or more topics and one or more clusters in the unlabeled data which is done by one or more machine learning algorithms using the one or more parameters. Furthermore, the method comprises generating a prioritized list of one or more keywords for each of the one or more topics by the one or more machine learning algorithms. Also, the method comprises inputting the prioritized list of the one or more keywords to at least one language learning model. Then, the method comprises outputting a keyword from the prioritized list of the one or more keywords by the at least one language learning model. The method also comprises labeling a cluster of the one or more clusters with the keyword if the keyword meets a predefined threshold. The method also then comprises training the classification model using one or more first labeled clusters. Additionally, the method comprises rendering on a user interface, one or more recommendations related to the facility such that the one or more recommendations are provided by the trained classification model.

In accordance with another embodiment of the current disclosure, a system for constructing a classification model using data associated with a facility is described herein. The system comprises a processor and a memory communicatively coupled to the processor, wherein the memory comprises one or more instructions which when executed by the processor, cause the processor to retrieve from a database unlabeled data associated with the facility. The processor is also configured to determine one or more parameters in the unlabeled data based on an application of at least one first algorithm on the unlabeled data. Then, the processor is configured to identify one or more topics and one or more clusters in the unlabeled data by one or more machine learning algorithms using the one or more parameters. Also, the processor is configured to generate a prioritized list of one or more keywords for each of the one or more topics by the one or more machine learning algorithms. Further, the processor is configured to input the prioritized list of the one or more keywords to at least one language learning model. Furthermore, the processor is configured to output a keyword from the prioritized list of the one or more keywords by the at least one language learning model. Also, the processor is configured to label a cluster of the one or more clusters with the keyword if the keyword meets a predefined threshold. Then, the processor is configured to train the classification model using one or more first labeled clusters. Additionally, the processor is configured to render on a user interface, one or more recommendations related to the facility such that the one or more recommendations are provided by the trained classification model.

In accordance with yet another embodiment of the current disclosure, a non-transitory, computer-readable storage medium having instructions stored thereon and executable by one or more processors is described herein. In this regard, the instructions when executed by one or more processors cause the one or more processors to retrieve from a database unlabeled data associated with a facility. Further, the one or more processors are configured to determine one or more parameters in the unlabeled data based on an application of at least one first algorithm on the unlabeled data. Furthermore, the one or more processors are configured to identify one or more topics and one or more clusters in the unlabeled data by one or more machine learning algorithms using the one or more parameters. Also, the one or more processors are configured to generate a prioritized list of one or more keywords for each of the one or more topics by the one or more machine learning algorithms. Then, the one or more processors are configured to input the prioritized list of the one or more keywords to at least one language learning model. The one or more processors are also configured to output a keyword from the prioritized list of the one or more keywords by the at least one language learning model. The one or more processors are also then configured to label a cluster of the one or more clusters with the keyword if the keyword meets a predefined threshold. Using one or more first labeled clusters, the one or more processors train the classification model. Additionally, the one or more processors are configured to render on a user interface, one or more recommendations related to the facility such that the one or more recommendations are provided by the trained classification model.

The above summary is provided merely for purposes of providing an overview of one or more exemplary embodiments described herein so as to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which are further explained in the following description and its accompanying drawings.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

DETAILED DESCRIPTION OF THE DRAWINGS

Reference will now be made in detail to embodiments, examples of which are illustrated in the accompanying drawings. In the following detailed description, numerous specific details are set forth in order to provide a thorough understanding of the various described example embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments. The term "or" is used herein in both the alternative and conjunctive sense, unless otherwise indicated. The terms "illustrative," "example," and "exemplary" are used to be examples with no indication of quality level. Like numbers refer to like elements throughout.

The phrases "in an embodiment," "in one embodiment," "according to one embodiment," and the like generally mean that the particular feature, structure, or characteristic following the phrase can be included in at least one example embodiment of the present disclosure and can be included in more than one example embodiment of the present disclosure (importantly, such phrases do not necessarily refer to the same example embodiment).

The word "exemplary" is used herein to mean "serving as an example, instance, or illustration." Any implementation described herein as "exemplary" is not necessarily to be construed as preferred or advantageous over other implementations. If the specification states a component or feature "can," "may," "could," "should," "would," "preferably," "possibly," "typically," "optionally," "for example," "often," or "might" (or other such language) be included or have a characteristic, that particular component or feature is not required to be included or to have the characteristic. Such component or feature can be optionally included in some example embodiments, or it can be excluded.

One or more example embodiments of the present disclosure may provide a platform or a framework in a facility that uses real-time accurate classification models and visual analytics to handle data associated with the facility. The platform is an extensible platform that is portable for deployment in any cloud or data center environment for providing an enterprise-wide, top to bottom view, displaying status of processes, assets, people, and/or safety. Further, the platform of the present disclosure supports end-to-end capability using data associated with the facility to provide appropriate analyses and/or predictions related to the facility as well.

At times, data associated with the facility in life sciences sector comprises diverse information related to various domains or functions in the facility and corresponds to huge amount of data. Often this data also includes confidential information or sensitive information. That is, the data associated with such facility comprises information such as patient records, proprietary research findings, and/or the like which corresponds to confidential or sensitive information. Additionally, it is required for the facility to comply with strict regulations, such as HIPAA (Health Insurance Portability and Accountability Act) that governs collection, storage, and sharing of such data. This makes it tough to access and share data (say, with third parties) for labeling due to concerns about privacy or confidentiality. At times, the facility hires domain experts or proficient annotators to manually classify or label such data say, to be compatible with Machine Learning (ML) and/or Artificial Intelligence

5

6

(AI) applications. However, this is associated with several challenges. Firstly, experts or annotators may fail to precisely annotate the data for generating labeled or classified data provided that the volume of data is humongous. Secondly, quality of labeled or classified data generated due to manual annotation may be subjected to bias stemming due to subjective judgments of experts or annotators. Thirdly, experts or annotators may fail to provide meticulous attention to every detail in the data. It is to be noted that for efficient utilization of ML and/or AI applications, it is required to have high quality labeled data. Said alternatively, quality, quantity, and diversity of labeled data plays pivotal role in shaping the performance of ML and/or AI applications. With such manual annotation, overall quality of labeled data reduces making the labeled data unreliable for ML and/or AI applications. When low quality labeled data is used, models in the ML and/or AI applications provide inaccurate outputs, become susceptible to bias stemming from subjective judgments, and/or the like thereby reducing overall efficiency and performance of the ML and/or AI applications. This makes processing and handling data in the facility a complicated task.

Proposes to develop systems and methods for constructing a classification model using data associated with a facility. In this regard, for instance, the automated system described herein is configured to generate high quality labeled data that is compatible for usage with machine learning (ML) and/or artificial intelligence (AI) applications in the facility. The system described herein is initially configured to retrieve from a database unlabeled data associated with the facility. The unlabeled data may correspond to data such as clinical notes, health records, medical literature, description of complaints received from customers associated with the facility, research findings, and/or the like. The unlabeled data stored in the database may be timestamped and associated with identifiers and/or other metadata as well. The system described herein may retrieve the unlabeled data spanning across a specific timeframe and the timeframe may be expressed in terms of hours, days, weeks, months, and/or years. Upon retrieval of such unlabeled data, the system determines one or more parameters in the unlabeled data and the one or more parameters correspond to number of topics and number of clusters in the unlabeled data. In this regard, the system applies at least one first algorithm on the unlabeled data to determine the one or more parameters. The first algorithm may correspond to Bayesian optimization. That is, the system identifies optimal number of topics and optimal number of clusters in the unlabeled data based on the application of Bayesian optimization on the unlabeled data. For this, the system utilizes one or more defined objective functions to identify the optimal number of topics and the optimal number of clusters. In addition to Bayesian optimization, the system also utilizes one or more machine learning algorithms such as topic modeling and clustering algorithms to label the unlabeled data. In this regard, the system based on the application of Bayesian optimization also optimizes the one or more parameters for governing the one or more machine learning algorithms. The system using Bayesian optimization undertakes an iterative exploration of the one or more parameters in order to enable identification of one or more optimal parameters. This facilitates effective utilization of the one or more machine learning algorithms, and the system fine-tunes its overall configurations to achieve peak performance and efficiency as well.

Further, the system is configured to identify one or more topics and one or more clusters in the unlabeled data using the one or more parameters. In this regard, the system uses machine learning algorithms such as topic modeling and clustering algorithms to identify the one or more topics and the one or more clusters. The system using the topic modeling algorithms analyzes content (themes or subjects) in the unlabeled data. Then, the system generates interpretable one or more topics that encapsulate underlying content in the unlabeled data. The system then uses topic modeling algorithms along with clustering algorithms to cluster the unlabeled data into the one or more clusters. That is, using the topics and the underlying content, the unlabeled data is clustered into the one or more clusters by the system. Further, the system also assigns each of the one or more topics to at least one cluster of the one or more clusters based on the underlying content. This offers more meaningful and interpretable topics and clusters for efficient labeling of the unlabeled data. The system then generates one or more keywords for each of the one or more topics. For this, the system relies on the one or more machine learning algorithms to generate the one or more keywords. These keywords are generated based on content underlying in the respective clusters. For example, the one or more keywords may correspond to relevant synonyms of a topic of the one or more topics. Also, a number of keywords generated may be based on relevance of the keywords to the topic. Additionally, the system may selectively choose the keywords based on certain requirements or predefined thresholds. The system then prioritizes or ranks the one or more keywords based on relevance of the keywords to the topic. Based on such a prioritization or ranking, the system generates a prioritized list of the keywords for each of the topics using the machine learning algorithms.

Upon generating the prioritized list of the keywords, the system then inputs the prioritized list to at least one language learning model. The at least one language learning model may be, but not limited to Gemini, ChatGPT, and/or the like. Along with the prioritized list, the system also allows a user associated with the facility to provide one or more instruction prompts via a user interface to the at least one language learning model. The one or more instruction prompts correspond to one or more natural language statements provided by the user and often comprise instructions or requirements of the user. The one or more instruction prompts are often directed to refine the prioritized list of the keywords and/or to choose the best keyword from the prioritized list of the keywords. The at least one language learning model analyzes the prioritized list to output a keyword which corresponds to the best keyword from the prioritized list. That is, the at least language learning model consolidates the one or more keywords into a unique label representing an overall content in respective cluster so as to select the most appropriate label from the prioritized list of keywords. The at least one language learning model chooses the keyword based on the one or more instruction prompts as well. For each of the one or more instruction prompts, the at least one language learning model provides its choice of keyword based on the instruction prompt. Then, the at least one language learning model chooses the keyword which is most frequently output by the at least one language learning model. Alternatively, the system may rely on multiple language learning models to derive the best keyword from each of the language learning models. The system may select that keyword which is provided as output by most of the language learning models as well. The system then labels a cluster of the one or more clusters with the keyword. That is, corresponding content in the cluster is labeled with the keyword. Also, the system labels the cluster if the keyword meets a predefined threshold, and the predefined threshold may correspond to a frequency with which the at least one language learning model outputs the keyword.

Upon labeling the one or more clusters, the system trains a classification model using at least some portion of the labeled clusters. That is, the system trains the classification model using one or more first labeled clusters which corresponds to training data. In addition to the training data, the system also splits at least some portions of the labeled clusters as validation data and observation data. In this regard, one or more second labeled clusters correspond to the validation data while one or more third labeled clusters correspond to the observation data. It is to be noted that count of clusters in the training data may be significantly greater than that of in the validation data and/or the observation data. While training the classification model using the training data, the validation data and the observation data is passed to a human labeler for verification. That is, the human labeler investigates the validation data and the observation data for checking accuracy of labeling by the system. Upon training the classification model, output (recommendations such as predictions, insights, etc.) provided by the classification model is validated using the verified validation data. If accuracy of the model is unsatisfactory, that is if the output of the model is not accurate enough as per expectations, a fine-tuning strategy can be employed. Such a strategy may be provided by the human labeler and involves optimization of the one or more parameters based on the validation data. Additionally, performance of the classification model is improved using the verified observation data. For this, the system employs Bayesian update where the system sends the verified observation data to Bayesian update to continuously improve labeling accuracy of the system. By incorporating Bayesian update, the system adapts and refines its labeling strategies based on new information and feedback as well. This also ensures that the classification model remains up-to-date and effective in handling evolving datasets. Further, the trained classification model provides one or more recommendations related to the facility. These recommendations may correspond to predictions related to the facility, pattern identification in data associated with the facility, actions to be taken in the facility, labels for data associated with particular operations in the facility, etc., Such recommendations are also rendered on a display of a computing device so that personnel in the facility can view the recommendations and/or take appropriate actions in the facility.

With this, the system described herein efficiently labels unlabeled data to construct the classification model as a part of machine learning (ML) and/or artificial intelligence (AI) applications in the facility. This saves significant time and resources compared to manual labeling, and the system can process large volumes of data quickly and consistently. The automated labeling system described herein can scale effortlessly to handle massive datasets, making them suitable for tasks requiring large amounts of labeled data. Automated labeling ensures consistency in labeling standards across datasets and eliminates human errors and biases associated with manual labeling. Additionally, automating labeling process can reduce labor costs associated with manual labeling efforts, which makes it a cost-effective solution for data labeling tasks. The system can automatically label data in real-time or near real-time, enabling the facility to process and analyze incoming data streams continuously. The automated system can learn from user feedback and iteratively improve labeling process over time, leading to higher-quality labeled datasets. With this, processing and handling data in the facility becomes an efficient task.

FIG. 1 illustrates a schematic diagram showing an exemplary environment comprising multiple facilities. According to various example embodiments described herein, an exemplary environment 100 comprises one or more facilities 102a, 102b, . . . 102n (collectively "facilities 102"). In some example embodiments, a facility of the one or more facilities 102a, 102b, . . . 102n may be related to life sciences sector. In this regard, the facility for example, may correspond to a pharmaceutical industry, a medical device company, a healthcare firm, and/or the like. In some example embodiments, the one or more facilities 102a, 102b, . . . 102n in the illustrative environment 100 may be of same type. In some example embodiments, the one or more facilities 102a, 102b, . . . 102n in the illustrative environment 100 may be of different type. As it may be understood, in some example embodiments described herein, the facility of the one or more facilities 102a, 102b, . . . 102n often employs several verticals or functions to cater various requirements of customers. These verticals or functions are often diverse in nature in the facility. For example, the verticals may correspond to compliance tracking, recall management, complaint management, patient record management, research and development, knowledge bank management, and/or the like. Each of such verticals or functions itself comprise huge amount of data. For example, with regards to complaint management, there may be millions of complaints received from customers across the globe. In another example, with regards to patient record management, there may be huge number of records that needs to be maintained by the facility. At times, the facility relies on machine learning (ML) and/or artificial intelligence (AI) models to derive insights from the data. However, at least some of this data may be unlabeled and with such unlabeled data, the ML and/or AI models may not provide accurate outputs i.e., insights as per expectations. Per this aspect, the facility needs to accurately label the data for deriving better insights.

In some example embodiments, a cloud 106 is operably coupled with one or more facilities 102a, 102b, . . . 102n, meaning that communication between the cloud 106 and one or more facilities 102a, 102b, . . . 102n is enabled. The cloud 106 may represent distributed computing resources, software, platform or infrastructure services which can enable data handling, data processing, data management, and/or analytical operations on data exchanged & transacted in the facilities 102. In some example embodiments described herein, the cloud 106 represents a platform that comprises one or more services to label unlabeled data and construct appropriate classification model(s) using labeled data associated with the facility. Per this aspect, the one or more services of the cloud 106 appropriately handle, process, and/or manage the data at the cloud 106. In this regard, the data at the cloud 106 corresponds to clinical notes, health records, medical literature, description of complaints received from customers associated with the facility, research findings, and/or the like. This data may also comprise other metadata relevant to the said data as well. Also, the cloud 106 may include and/or generate classification model(s) required to handle, process, and/or manage the data of a respective facility. In some example embodiments, the cloud 106 includes one or more servers that may be programmed to communicate with the one or more facilities 102a, 102b, . . . 102n and to exchange data as appropriate. The cloud 106 may be a single computer server or may include a plurality of computer servers. In some example embodiments, the cloud 106 may represent a hierarchal arrangement of two or more computer servers, where perhaps a lower-level computer server (or servers) processes the data, for example, while a higher-level computer server oversees operation of the lower-level computer server or servers.

Each of the facilities 102 may include a variety of operations or functions. In this regard, each of the facilities 102 may generate humongous data for respective operations. In some example embodiments, the cloud 106 may manage the data and/or automatically control operations in the facilities 102 using the classification model(s). In this regard, in the example shown in FIG. 1, each of the one or more facilities 102*a*, 102*b*, . . . 102*n* includes a respective edge controller (alternatively, edge gateway) 104*a*, 104*b*, . . . 104*n* (collectively "edge controllers 104" or "edge gateways 104"). In some example embodiments, each of one or more edge controllers 104*a*, 104*b*, . . . 104*n* is configured to receive the data from the respective facilities 102. In this regard, in some example embodiments, the necessary data in the respective facility may be provided by users such as customers and/or personnel associated with the respective facility. Also, in some example embodiments, the cloud 106 can transmit one or more instructions to an edge controller of the respective facility in order to control one or more operations in the respective facility. In some examples, the one or more edge controllers 104*a*, 104*b*, . . . 104*n* may operate as intermediary node to transact the data between the facilities 102 and/or the cloud 106. In some examples, each of the one or more edge controllers 104*a*, 104*b*, . . . 104*n* is capable of receiving the data from disparate data sources e.g., but not limited to, in different data formats and/or using various data communication protocols, from the facilities 102. In this regard, each of the one or more edge controllers 104*a*, 104*b*, . . . 104*n* can receive & filter the data and translate the data into a common language and/or format (e.g. normalized data) for subsequent communication to the cloud 106. The common language and/or format may be compatible with and expected by the cloud 106.

Figure 2:
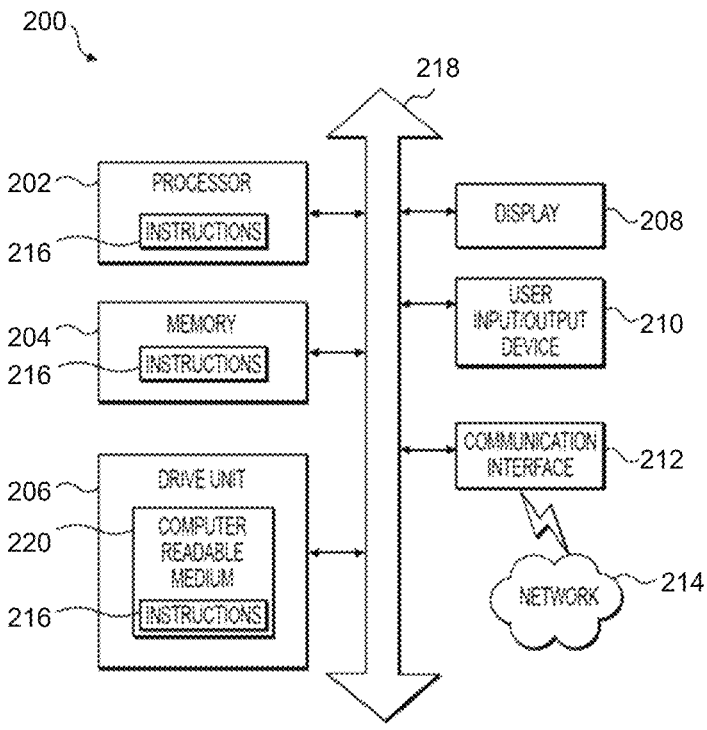
FIG. 2 illustrates a schematic diagram showing an implementation of a controller that may execute techniques, in accordance with one or more example embodiments described herein.

FIG. 2 illustrates a schematic diagram showing an implementation of a controller that may execute techniques in accordance with one or more example embodiments described herein. In one or more example embodiments, controller 200 described herein may include a set of instructions that can be executed to cause the controller 200 to perform any one or more of the methods or computer-based functions disclosed herein. The controller 200 may operate as a standalone device or may be connected, e.g., using a network, to other computer systems or peripheral devices.

In a networked deployment, the controller 200 may operate in the capacity of a server or as a client in a server-client user network environment, or as a peer computer system in a peer-to-peer (or distributed) network environment. The controller 200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the controller 200 can be implemented using electronic devices that provide voice, video, or data communication. Further, while the controller 200 is illustrated as a single system, the term "system" shall also be taken to include any collection of systems or sub-systems that individually or jointly execute a set, or multiple sets, of instructions to perform one or more computer functions.

As illustrated in FIG. 2, the controller 200 may include a processor 202, e.g., a central processing unit (CPU), a graphics processing unit (GPU), or both. The processor 202 may be a component in a variety of systems. For example, the processor 202 may be part of a standard computer. The processor 202 may be one or more general processors, digital signal processors, application specific integrated circuits, field programmable gate arrays, servers, networks, digital circuits, analog circuits, combinations thereof, or other now known or later developed devices for analyzing and processing data. The processor 202 may implement a software program, such as code generated manually (i.e., programmed).

The controller 200 may include a memory 204 that can communicate via a bus 218. The memory 204 may be a main memory, a static memory, or a dynamic memory. The memory 204 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 204 includes a cache or random-access memory for the processor 202. In alternative implementations, the memory 204 is separate from the processor 202, such as a cache memory of a processor, the system memory, or other memory. The memory 204 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 204 is operable to store instructions executable by the processor 202. The functions, acts or tasks illustrated in the figures or described herein may be performed by the processor 202 executing the instructions stored in the memory 204. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

As shown, the controller 200 may further include a display 208, such as a liquid crystal display (LCD), an organic light emitting diode (OLED), a flat panel display, a solid-state display, a cathode ray tube (CRT), a projector, a printer or other now known or later developed display device for outputting determined information. The display 208 may act as an interface for the user to see the functioning of the processor 202, or specifically as an interface with the software stored in the memory 204 or in the drive unit 206. Additionally or alternatively, the controller 200 may include an input/output device 210 configured to allow a user to interact with any of the components of controller 200. The input/output device 210 may be a number pad, a keyboard, or a cursor control device, such as a mouse, or a joystick, touch screen display, remote control, or any other device operative to interact with the controller 200. The controller 200 may also or alternatively include drive unit 206 implemented as a disk or optical drive. The drive unit 206 may include a computer-readable medium 220 in which one or more sets of instructions 216, e.g. software, can be embedded. Further, the instructions 216 may embody one or more of the methods or logic as described herein. The instructions 216 may reside completely or partially within the memory 204 and/or within the processor 202 during execution by the controller 200. The memory 204 and the processor 202 also may include computer-readable media as discussed above.

In some systems, a computer-readable medium 220 includes instructions 216 or receives and executes instructions 216 responsive to a propagated signal so that a device connected to a network 214 can communicate voice, video, audio, images, or any other data over the network 214. Further, the instructions 216 may be transmitted or received over the network 214 via a communication port or interface 212, and/or using a bus 218. The communication port or interface 212 may be a part of the processor 202 or may be a separate component. The communication port or interface 212 may be created in software or may be a physical connection in hardware. The communication port or interface 212 may be configured to connect with a network 214, external media, the display 208, or any other components in controller 200, or combinations thereof. The connection with the network 214 may be a physical connection, such as a wired Ethernet connection or may be established wirelessly as discussed below. Likewise, the additional connections with other components of the controller 200 may be physical connections or may be established wirelessly. The network 214 may alternatively be directly connected to a bus 218.

While the computer-readable medium 220 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 220 may be non-transitory, and may be tangible. The computer-readable medium 220 can include a solid-state memory such as a memory card or other package that houses one or more non-volatile read-only memories. The computer-readable medium 220 can be a random-access memory or other volatile re-writable memory. Additionally or alternatively, the computer-readable medium 220 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The controller 200 may be connected to a network 214. The network 214 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 214 may include wide area networks (WAN), such as the Internet, local area networks (LAN), campus area networks, metropolitan area networks, a direct connection such as through a Universal Serial Bus (USB) port, or any other networks that may allow for data communication. The network 214 may be configured to couple one computing device to another computing device to enable communication of data between the devices. The network 214 may generally be enabled to employ any form of machine-readable media for communicating information from one device to another. The network 214 may include communication methods by which information may travel between computing devices. The network 214 may be divided into sub-networks. The sub-networks may allow access to all of the other components connected thereto or the sub-networks may restrict access between the components. The network 214 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof. It will be understood that the steps of methods discussed are performed in one embodiment by an appropriate processor (or processors) of a processing (i.e., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Figure 3:
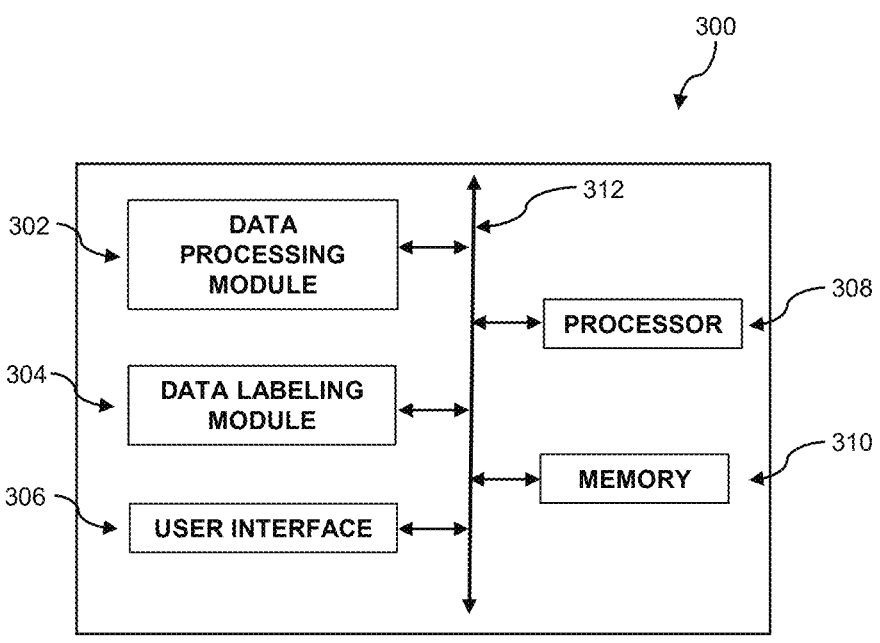
FIG. 3 illustrates a schematic diagram showing an implementation of an exemplary labeling system, in accordance with one or more example embodiments described herein.

FIG. 3 illustrates a schematic diagram showing an implementation of an exemplary labeling system, in accordance with one or more example embodiments described herein. In one or more example embodiments, the labeling system 300 described herein is configured to automatically label unlabeled data associated with a facility (for instance, one or more facilities 102a, 102b, . . . 102n as described in FIG. 1 of the current disclosure) and construct classification model(s) using the labeled data. Generally, the facility maintains data sources such as repositories or databases to store data relevant to the facility. In this regard, at least some of this data may be unlabeled. Said alternatively, at least some of this data may be in its raw form without any specific label or defined explanation. The labeling system 300 initially retrieves unlabeled data associated with the facility from a database. The unlabeled data may correspond to data related to the facility such as clinical notes, health records, medical literature, description of complaints received from customers associated with the facility, research findings, and/or the like. Upon retrieval of such unlabeled data, the labeling system 300 described herein is configured to use at least one first algorithm to determine one or more parameters in the unlabeled data. These parameters correspond to number of topics and number of clusters in the unlabeled data determined by the at least one first algorithm.

Further, the labeling system 300 relies on one or more machine learning algorithms such as topic modeling and clustering algorithms to identify corresponding topics and corresponding clusters in the unlabeled data. In this regard, the labeling system 300 also considers the one or more parameters to identify topics and clusters in the unlabeled data. For each of the identified topics, the labeling system 300 generates a list of keywords using the one or more machine learning algorithms. These keywords act as consolidated representation of content in respective clusters. Also, the keywords in the list are prioritized or ranked as well by the labeling system 300. Such prioritized list of keywords for each topic is then input into at least one language learning model. The at least one language learning model may be, but not limited to Gemini, ChatGPT, and/or the like. In this regard, the labeling system 300 allows a user associated with the facility to input the prioritized list of keywords to the at least one language learning model via a user interface. In addition to the prioritized list, the user also provides one or more instruction prompts to the at least one language learning model. Based at least on the one or more instruction prompts, the at least one language learning model analyzes the prioritized list to output a keyword which corresponds to the best keyword from the prioritized list.

Using the keyword, the labeling system 300 labels at least one cluster of the clusters. This is based on a check using a predefined threshold as well. Upon labeling the clusters, the labeling system 300 trains a classification model using a first set of labeled clusters. Additionally, the labeling system 300 also considers a second set of labeled clusters and a third set of labeled clusters for further validation and further training of the classification model as well. Such a trained classification model provides recommendation(s) (such as predictions, insights, etc.) associated with the facility. These recommendation(s) are renderable on a display of a computing device (not shown) or the user interface so that personnel in the facility can view the recommendation(s) and/or take appropriate actions in the facility. The automated labeling system 300 described herein can scale effortlessly to handle massive datasets, making them suitable for tasks requiring large amounts of labeled data. Automated labeling ensures consistency in labeling standards across datasets and eliminates human errors and biases associated with manual labeling. The labeled data generated herein is compatible for usage with various machine learning (ML) and/or artificial intelligence (AI) applications in the facility as well. Also, the data associated with life sciences sector is often confidential or contains sensitive information. For maintaining privacy, management and processing of such data is tied with strict regulations. For instance, health records of patients include sensitive information while collection, storage, and sharing of this data is tied with regulations such as, but not limited to HIPAA (Health Insurance Portability and Accountability Act). Even in view of such constraints, the labeling system 300 described herein facilitates secured classification and labeling of the unlabeled data based on construction of classification model(s) which is compliant with the regulations as well.

In some example embodiments, the labeling system 300 is a server system (e.g., a server device) that facilitates a data analytics platform between one or more computing devices, one or more data sources, and/or one or more facilities. In some example embodiments, the labeling system 300 is a device with one or more processors and a memory. Also, in some example embodiments, the labeling system 300 is implementable via the cloud 106. The labeling system 300 is implementable in one or more facilities related to one or more technologies, for example, but not limited to, enterprise technologies, connected building technologies, industrial technologies, Internet of Things (IoT) technologies, data analytics technologies, digital transformation technologies, cloud computing technologies, cloud database technologies, server technologies, network technologies, private enterprise network technologies, wireless communication technologies, machine learning technologies, artificial intelligence technologies, digital processing technologies, electronic device technologies, computer technologies, supply chain analytics technologies, aircraft technologies, industrial technologies, cybersecurity technologies, navigation technologies, asset visualization technologies, oil and gas technologies, petrochemical technologies, refinery technologies, life science technologies, process plant technologies, procurement technologies, and/or one or more other technologies.

In some example embodiments, the labeling system 300 comprises one or more components (or one or more modules) such as, a data processing module 302, a data labeling module 304, and/or a user interface 306. Additionally, in one or more example embodiments, the labeling system 300 comprises a processor 308 and/or a memory 310. In one or more example embodiments, the one or more components of the labeling system 300 may be communicatively coupled to processor 308 and/or a memory 310 via a bus 312. In certain example embodiments, one or more aspects of the labeling system 300 (and/or other systems, apparatuses and/or processes disclosed herein) constitute executable instructions embodied within a computer-readable storage medium (e.g., the memory 310). For instance, in an example embodiment, the memory 310 stores computer executable component and/or executable instructions (e.g., program instructions). Furthermore, the processor 308 facilitates execution of the computer executable components and/or the executable instructions (e.g., the program instructions). In an example embodiment, the processor 308 is configured to execute instructions stored in the memory 310 or otherwise accessible to the processor 308.

The processor 308 is a hardware entity (e.g., physically embodied in circuitry) capable of performing operations according to one or more embodiments of the disclosure. Alternatively, in an example embodiment where the processor 308 is embodied as an executor of software instructions, the software instructions configure the processor 308 to perform one or more algorithms and/or operations described herein in response to the software instructions being executed. In an example embodiment, the processor 308 is a single core processor, a multi-core processor, multiple processors internal to the labeling system 300, a remote processor (e.g., a processor implemented on a server), and/or a virtual machine. In certain example embodiments, the processor 308 is in communication with the memory 310, the data processing module 302, the data labeling module 304, and/or the user interface 306 via the bus 312 to, for example, facilitate transmission of data between the processor 308, the memory 310, the data processing module 302, the data labeling module 304, and/or the user interface 306. In some example embodiments, the processor 308 may be embodied in a number of different ways and, in certain example embodiments, includes one or more processing devices configured to perform independently. Additionally or alternatively, in one or more example embodiments, the processor 308 includes one or more processors configured in tandem via bus 312 to enable independent execution of instructions, pipelining of data, and/or multi-thread execution of instructions.

The memory 310 is non-transitory and includes, for example, one or more volatile memories and/or one or more non-volatile memories. In other words, in one or more example embodiments, the memory 310 is an electronic storage device (e.g., a computer-readable storage medium). The memory 310 is configured to store information, data, content, one or more applications, one or more instructions, or the like, to enable the labeling system 300 to carry out various functions in accordance with one or more embodiments disclosed herein. In accordance with some example embodiments described herein, the memory 310 may correspond to an internal or external memory of the labeling system 300. In some examples, the memory 310 may correspond to a database communicatively coupled to the labeling system 300. As used herein in this disclosure, the term "component," "system," and the like, is a computer-related entity. For instance, "a component," "a system," and the like disclosed herein is either hardware, software, or a combination of hardware and software. As an example, a component is, but is not limited to, a process executed on a processor, a processor circuitry, an executable component, a thread of instructions, a program, and/or a computer entity.

In one or more example embodiments, the data processing module 302 of the labeling system 300 retrieves unlabeled data associated with the facility. The unlabeled data associated with the facility corresponds to data such as clinical notes, health records, medical literature, description of complaints received from customers associated with the facility, research findings, and/or the like. The unlabeled data may be stored in a database (or a repository) associated with the facility. It is to be noted that the unlabeled data may be stored in various electronic formats like images, documents, and/or the like in the database. The facility may maintain the database by regularly updating the unlabeled data in the database. In addition to the unlabeled data, the database may also contain other data associated with the facility. Also, the unlabeled data stored in the database may be timestamped and associated with identifiers and/or other metadata as well. It is to be noted that the data processing module 302 of the labeling system 300 may retrieve only specific unlabeled data. That is, the data processing module 302 may retrieve the unlabeled data spanning across a specific timeframe. The timeframe may be expressed in terms of hours, days, weeks, months, and/or years. For example, the data processing module 302 may retrieve unlabeled data of last two days. In another example, the data processing module 302 may retrieve unlabeled data of last three weeks. Yet in another example, the data processing module 302 may retrieve unlabeled data of last four years. In this regard, the facility (or personnel associated with the facility) chooses the timeframe based on one or more requirements in order to retrieve the unlabeled data from the database. After setting the specific timeframe, the data processing module 302 retrieves the required unlabeled data from the database. Upon retrieving such data, the data processing module 302 may also pre-process the unlabeled data. In this regard, the data processing module 302 may cleanse the unlabeled data to filter unwanted or redundant data records from the retrieved unlabeled data. This is done so that the unlabeled data is compatible for further processing by the data labeling module 304.

In one or more example embodiments, the data processing module 302 then transmits the unlabeled data to the data labeling module 304. The data labeling module 304, in one or more example embodiments, then ingests the unlabeled data based on an application of at least one first algorithm on the unlabeled data. In this regard, the at least one first algorithm in the data labeling module 304 corresponds to Bayesian optimization. The data labeling module 304 may also comprise other algorithms similar to Bayesian optimization as part of the at least one first algorithm. Based on the ingestion of the unlabeled data by the at least one first algorithm, the data labeling module 304 identifies one or more parameters in the unlabeled data. The one or more parameters correspond to, but not limited to a number of topics, a number of clusters, and/or the like in the unlabeled data. Also, the data labeling module 304 employs one or more defined objective functions to identify the one or more parameters based on the ingestion of the unlabeled data by the at least one first algorithm. It is to be noted that the one or more parameters determined by the data labeling module 304 may correspond to one or more optimal parameters in the unlabeled data. For instance, the number of topics and the number of clusters determined by the data labeling module 304 may correspond to an optimal number of topics and an optimal number of clusters in the unlabeled data. For this, the data labeling module 304 using the at least one first algorithm for instance, using Bayesian optimization undertakes an iterative exploration of parameter(s) based on the one or more defined objective functions. Such an iterative approach facilitates optimization of the parameter(s). So the one or more parameters determined in the unlabeled data are optimal in nature. In addition to the at least one first algorithm, in one or more example embodiments, the data labeling module 304 also comprises one or more machine learning algorithms for further processing and analysis of the unlabeled data. The data labeling module 304 optimizes the one or more parameters during the iterative exploration to achieve effective utilization of the one or more machine learning algorithms as well. Also, the data labeling module 304 fine-tunes overall configuration of the labeling system 300 using the one or more parameters in order to attain peak performance and efficiency. An exemplary graphical representation of optimal number of topics and optimal number of clusters is also described in more details in accordance with FIG. 4 of the current disclosure.

Then, in one or more example embodiments, the data labeling module 304 identifies one or more topics and one or more clusters in the unlabeled data based on the one or more parameters. In this regard, the data labeling module 304 uses the one or more machine learning algorithms to identify topics and clusters in the unlabeled data. The one or more machine learning algorithms in the data labeling module 304 correspond to topic modeling and clustering algorithms. The data labeling module 304 may also comprise other algorithms similar to topic modeling and clustering algorithms as part of the one or more machine learning algorithms. The data labeling module 304 using the one or more machine learning algorithms analyzes content in the unlabeled data. For instance, the data labeling module 304 initially applies topic modeling algorithms on the unlabeled data. With this, the data labeling module 304 analyzes content that is, themes or subjects in the unlabeled data. Further, the data labeling module 304 described herein generates the one or more topics based on the analysis of content in the unlabeled data using the one or more machine learning algorithms. These topics encapsulate underlying content in the unlabeled data. In this regard, the data labeling module 304 initially determines certain topics in the unlabeled data based on the analysis of content in the unlabeled data. But considering the number of topics as one of a factor, the data labeling module 304 then picks only few from the determined topics. That is, the data labeling module 304 chooses or shortlists only few topic(s) or best topic(s) from the determined topics based on the number of topics. Such chosen topic(s) are deemed to be optimal topic(s) and correspond to the one or more topics identified by the data labeling module 304. Per this aspect, count of the one or more topics identified by the data labeling module 304 may be same as that of the number of topics determined by the at least one first algorithm. For example, a document may comprise huge number of complaints received from diverse customers across the globe. And this document may just comprise description of each of the complaints along with respective date of receipt. Other sensitive information such as identifier of customers and/or the like may be masked for privacy. This data is in its crude or raw form. When such unlabeled data or crude data is passed on to the data labeling module 304, the data labeling module 304 applies the one or more machine learning algorithms (say, topic modeling algorithms initially) on description of each of the complaints. The data labeling module 304 then analyzes underlying content in each description of the complaints based on the application of the one or more machine learning algorithms. Upon such analysis, the data labeling module 304 generates topics that encapsulate description of various complaints in the document. In this regard, initial count of topics may correspond to, for example, 10 while number of topics determined by the at least one first algorithm may correspond to, for example, 3 for this document. So, the data labeling module 304 may choose 3 best topics from 10 topics. The chosen 3 topics may correspond to optimal number of topics in the document.

Further, in one or more example embodiments described herein, the data labeling module 304 uses the one or more machine learning algorithms to cluster the unlabeled data into the one or more clusters. Additionally, the data labeling module 304 also considers the one or more topics to cluster the unlabeled data into the one or more clusters. In this regard, the data labeling module 304 uses topic modeling algorithms along with clustering algorithms to identify the one or more clusters. For this, the data labeling module 304 analyzes underlying content in the unlabeled data using the one or more machine learning algorithms. That is, the data labeling module 304 using, for instance, clustering algorithms then analyzes underlying content in the unlabeled data. It is to be appreciated that the data labeling module 304 may also rely on topic modeling algorithms here to analyze underlying content in the unlabeled data. Upon analysis of underlying content, the data labeling module 304 clusters the unlabeled data into certain interim clusters. But then, the data labeling module 304 considers the number of clusters as one of a factor while the one or more topics as another factor as well. Additionally, it is to be noted that count of the one or more clusters identified by the data labeling module 304 may be same as that of the number of clusters determined by the at least one first algorithm. Considering such factors, the data labeling module 304 deduces the one or more clusters from the interim clusters. Such cluster(s) are deemed to be optimal cluster(s) and correspond to the one or more clusters identified by the data labeling module 304. Each cluster often represents a portion of the unlabeled data which has similar underlying content. Upon identification of the one or more clusters, the data labeling module 304 assigns each of the one or more topics to at least one cluster of the one or more clusters. Also, the data labeling module 304 assigns topic(s) to cluster(s) considering underlying content in respective cluster. This offers more meaningful and interpretable topics and clusters for efficient labeling of the unlabeled data.

Then, in one or more example embodiments described herein, the data labeling module 304 generates one or more keywords for each of the one or more topics. In this regard, the data labeling module 304 relies on the one or more machine learning algorithms again to generate the one or more keywords. These keywords are generated based on content underlying in that cluster(s) for which a corresponding topic is assigned. In one example, the one or more keywords for a topic may correspond to relevant synonyms of that topic. In another example, the one or more keywords for a topic may correspond to most frequently or repeatedly used terms in respective clusters for that topic. It is to be appreciated that the data labeling module 304 may generate only required number of keywords. That is, a number of keywords generated may be limited and may be based on relevance to a corresponding topic. Additionally, the data labeling module 304 also employs constraints such as requirements of the facility and/or a defined threshold to generate the one or more keywords. In view of such constraints, the data labeling module 304 selectively chooses and generates the said keywords. Then, the data labeling module 304 also prioritizes or ranks the one or more keywords. Such prioritization or ranking is based on relevance of the keywords to a corresponding topic. Based on such prioritization or ranking, the data labeling module 304 generates a prioritized list of the one or more keywords for each of the one or more topics using the one or more machine learning algorithms.

In one or more example embodiments described herein, the data labeling module 304 of the labeling system 300 also comprises at least one language learning model. It is to be noted that the at least one language learning model may be, but not limited to Gemini, ChatGPT, and/or the like. Upon generating the prioritized list of the keywords, the data labeling module 304 may also render the prioritized list via the user interface 306 and/or a display of a computing device (not shown). Further, the data labeling module 304 inputs the prioritized list to the at least one language learning model. In this regard, the data labeling module 304 may input the prioritized list to the at least one language learning model based on instruction prompt(s) from a user associated with the facility. That is, the user provides the one or more instruction prompts to the data labeling module 304 for instance, upon rendering the prioritized list. In some example embodiments, the user may provide the instruction prompt(s) via the user interface 306 of the labeling system 300. Whereas in some other example embodiments, the user may provide the instruction prompt(s) via the display of the computing device (not shown). The computing device may be associated with one or more users such as personnel related to the facility. The user interface 306 may correspond to a graphical user interface (GUI), a human computer interface (HCI), and/or any other type of display. It is to be appreciated that the display of the computing device may be similar to the user interface 306 described herein. The one or more instruction prompts correspond to one or more natural language statements provided by the user. Often, these prompts comprise instructions and/or requirements desired by the user. For example, a prompt of the one or more instruction prompts may comprise a statement from a user for the data labeling module 304 to select the best keyword from the prioritized list of the keywords. In another example, a prompt of the one or more instruction prompts may comprise a statement from a user stating the language learning model(s) to which the prioritized list of the keywords is to be inputted by the data labeling module 304. Yet in another example, a prompt of the one or more instruction prompts may comprise a statement from a user to refine the prioritized list of the keywords. Also, in another example, a prompt of the one or more instruction prompts may comprise a statement from a user to refine an output provided by the at least one language learning model. An exemplary user interface rendering one or more exemplary instruction prompts is also described in more details in accordance with FIG. 5 of the current disclosure.

Then, in one or more example embodiments, the data labeling module 304 inputs the prioritized list to the at least one language learning model along with the one or more instruction prompts. Upon inputting the prioritized list along with the one or more instruction prompts, the data labeling module 304 outputs a keyword from the prioritized list of the one or more keywords. That is, the at least one language learning model analyzes the prioritized list to output a keyword. In this regard, the at least one language learning model in the data labeling module 304 interprets each of the one or more keywords. This interpretation may also be based on the one or more instruction prompts provided by the user. Said alternatively, the at least one language learning model interprets the keywords in light of the one or more instruction prompts provided by the user. It is to be appreciated that the interpretation may also be based on ranking of the keywords as well. Upon interpreting the keywords, the at least one language learning model consolidates the interpretation of each of the one or more keywords in the prioritized list. That is, the interpretation of each of the keywords in light of the instruction prompts and/or the ranking is then consolidated. This helps in understanding relevance of each of the keywords to corresponding identified topic in view of the instruction prompts. Based on such consolidated interpretation, the at least one language learning model chooses the keyword from the prioritized list of the one or more keywords. In one or more example embodiments described herein, the data labeling module 304 may additionally employ strategies while choosing the keyword. The strategies may comprise one or more rules which the data labeling module 304 may consider while choosing the keyword. Additionally, these rules also serve as a predefined threshold for choosing the keyword and then using it for labeling cluster(s). For example, a rule of the one or more rules may correspond to determination of frequency with which a language learning model outputs a keyword. In this regard, if the same keyword is outputted by the language learning model multiple times or predefined times, then the same may be chosen as the best keyword. In another example, a rule of the one or more rules may correspond to comparison of keyword outputted by each of the language learning model(s). In this regard, if the same keyword is outputted by majority of the language learning model(s) or predefined number of language learning model(s), then the same may be chosen as the best keyword. So using such strategies, the data labeling module 304 aims to select the best keyword and to achieve accurate labeling for the unlabeled data.

Further, in one or more example embodiments, the data labeling module 304 outputs the keyword upon choosing the keyword. In this regard, the keyword may be rendered via the user interface 306 and/or the display of the computing device. This facilitates the user to review the keyword chosen from the prioritized list of the one or more keywords. Mostly, the keyword chosen by the at least one language learning model may be the best keyword for corresponding identified topic. While it is also to be noted that in some instances, the data labeling module 304 may also allow the user to provide additional instruction prompts to further refine a choice of keyword chosen by the at least one language learning model. Upon such refinements, that is considering at least the additional instruction prompts, the data labeling module 304 using the aforementioned techniques and/or strategies may then output the keyword from the prioritized list of the one or more keywords. This may be a refined keyword considering at least the additional instruction prompts from the user. This keyword may then be rendered via the user interface 306 and/or the display of the computing device as well. Further, it is to be appreciated that the data labeling module 304 may also allow the user to provide a prompt acknowledging the choice of the keyword by the data labeling module 304. Based at least on such prompts, the data labeling module 304 finalizes the keyword for corresponding topic and then to further label appropriate cluster(s). Additionally, the data labeling module 304 also checks if the keyword meets or satisfies the predefined threshold defined in the strategies to finalize the keyword. If the keyword meets the predefined threshold, the data labeling module 304 uses the keyword to label a cluster of the one or more clusters. It is to be noted that the keyword described herein indicates a unique label representing an overall content in respective cluster. Also, the keyword acts as the most optimal label and the most appropriate label from the prioritized list of keywords to label cluster(s).

In one or more example embodiments, the data labeling module 304 labels the one or more clusters using that keyword outputted for each of the one or more topics. In view of this, the data labeling module 304 also labels content underlying in the one or more clusters with appropriate label(s). The data labeling module 304 then generates one or more labeled clusters. Upon generating such labeled clusters, the data labeling module 304 splits the one or more labeled clusters. For instance, the data labeling module 304 categorizes the one or more labeled clusters as a first set of labeled clusters which has one or more first labeled clusters, a second set of labeled clusters which has one or more second labeled clusters, and a third set of labeled clusters which has one or more third labeled clusters. Additionally, the data labeling module 304 also splits labeled content underlying in a respective cluster as a part of categorization of the one or more labeled clusters. It is to be appreciated that the data labeling module 304 may split the one or more labeled clusters into any number of clusters as well based on the requirements in the facility. The first set of labeled clusters may correspond to training data while the second set of labeled clusters may correspond to validation data and the third set of labeled clusters may correspond to observation data. It is to be noted that count of clusters in the training data may be significantly greater than that of in the validation data and/or the observation data. Alternatively, count of labeled content in the training data may be significantly greater than that of in the validation data and/or the observation data.

Further, in one or more example embodiments, the data labeling module 304 uses the training data to train the classification model. That is, the data labeling module 304 utilizes the one or more first labeled clusters to train the classification model. In the meantime, the data labeling module 304 passes the validation data and the observation data to the user. The data labeling module 304 may render the validation data and/or the observation data say, via the user interface 306 (or the display) for the user to view. Upon rendering, the user verifies the validation data and/or the observation data for labeling accuracy by the data labeling module 304. At this point, the user may provide suggestions say, via the user interface 306 (or the display) to the labeling system 300 to improve its labeling accuracy as well. The data labeling module 304 may use such suggestions to improve labeling accuracy over time. Additionally, in one or more example embodiments described herein, upon training of the classification model using the training data, the trained classification model provides one or more recommendations. These recommendations are related to the facility and correspond to predictions, insights, etc., related to the facility. Once such recommendations are provided by the classification model which is trained, the data labeling module 304 also validates the recommendations. In this regard, the data labeling module 304 validates the one or more recommendations using the validation data that is verified by the user associated with the facility. With such validation, accuracy of the one or more recommendations provided by the classification model is determined. If the accuracy is unsatisfactory, that is if output of the trained classification model is not accurate enough as per expectations, fine-tuning strategies may be employed where such strategies may be provided by the user. For example, a strategy of the said strategies may correspond to optimization of the one or more parameters based on the validation data. Such strategies are often provided as first feedback by the user based on the validation of the one or more recommendations. Further, the data labeling module 304 passes the observation data to at least one second algorithm upon verification of the by the user. In this regard, the at least one second algorithm may correspond to Bayesian update. The data labeling module 304 may also comprise other algorithms similar to Bayesian update as part of the at least one second algorithm. Based on processing of the verified observation data by the at least one second algorithm, the data labeling module 304 then receives feedback say, second feedback from the at least one second algorithm. The second feedback may be used to improve performance of the classification model based on the verified observation data. Also, using the second feedback from the at least one second algorithm, the labeling system 300 adapts and refines its labeling strategies based on new information and/or other feedback. This also ensures that the classification model remains up-to-date and effective in handling evolving datasets. Then, based on the first feedback and/or the second feedback, the data labeling module 304 retrains the classification model. In light of such training, further in one or more example embodiments, the data labeling module 304 also provides the one or more recommendations related to the facility as well. The one or more recommendations may correspond to predictions related to the facility, pattern identification in data associated with the facility, actions to be taken in the facility, labels for data associated with particular operations in the facility, etc., Such recommendations are also rendered on the user interface 306 and/or the display of the computing device. This is to make sure that personnel in the facility can view the recommendations and/or take appropriate actions in the facility.

With this, the labeling system 300 described herein efficiently labels unlabeled data to construct the classification model as a part of machine learning (ML) and/or artificial intelligence (AI) applications in the facility. This saves significant time and resources compared to manual labeling, and the labeling system 300 can process large volumes of data quickly and consistently. The automated labeling system 300 described herein can scale effortlessly to handle massive datasets, making them suitable for tasks requiring large amounts of labeled data. Automated labeling ensures consistency in labeling standards across datasets and eliminates human errors and biases associated with manual labeling. Additionally, automating labeling process can reduce labor costs associated with manual labeling efforts, which makes it a cost-effective solution for data labeling tasks. The labeling system 300 can automatically label data in real-time or near real-time, enabling the facility to process and analyze incoming data streams continuously. The automated labeling system 300 can learn from user feedback and iteratively improve labeling process over time, leading to higher-quality labeled datasets. With this, processing and handling data in the facility becomes an efficient task in the facility.

Figure 4:
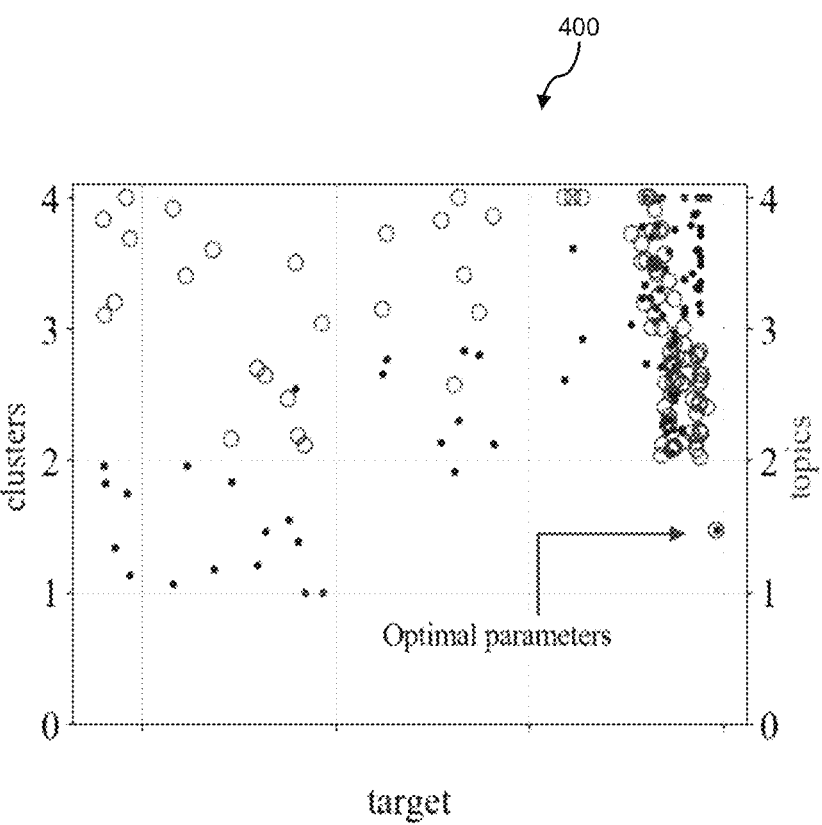
FIG. 4 illustrates a schematic diagram showing an exemplary graphical representation of optimal number of topics and optimal number of clusters, in accordance with one or more example embodiments described herein.

FIG. 4 illustrates a schematic diagram showing an exemplary graphical representation of optimal number of topics and optimal number of clusters, in accordance with one or more example embodiments described herein. In one or more example embodiments described herein, the data labeling module 304 of the labeling system 300 generates the exemplary graphical representation 400. Such graphical representation generated by the data labeling module 304 is often characterized by one or more axis. In this regard, parameters such as clusters, topics, and/or the like are often represented along the one or more axis. For instance, in the exemplary graphical representation 400 one axis represents clusters, while another axis represents topics, and yet another axis represents target. It is to be noted that the one or more axis in the graphical representation 400 may also be labeled accordingly. For instance, the axes in the graphical representation 400 are accordingly labeled as clusters, topics, and target. In one or more example embodiments, the graphical representation 400 may be generated by the data labeling module 304 while determining one or more parameters in unlabeled data as described in accordance with FIG. 3 of the current disclosure. That is, the graphical representation 400 may be generated when the data labeling module 304 ingests the unlabeled data using at least one first algorithm. More specifically, upon ingestion of the unlabeled data by the at least one first algorithm, the data labeling module 304 may analyze interrelationship between content underlying in the unlabeled data. In this regard, considering the interrelationship, the at least one first algorithm may determine an interim set of parameters and visualize them as different points. Further, the data labeling module 304 based on one or more defined objective functions optimizes interim set of parameters to derive one or more parameters which may be optimal in nature. For instance, different points in the graphical representation 400 may correspond to interim set of parameters for ingested unlabeled data. Upon using required defined objective functions, parameters that are optimal are derived and illustrated in the graphical representation 400.

FIG. 5 illustrates a schematic diagram showing an exemplary user interface rendering one or more exemplary instruction prompts, in accordance with one or more example embodiments described herein. The exemplary user interface 500 described herein may be part of the user interface 306 and/or the display described in accordance with FIG. 3 of the current disclosure. The user interface 500 allows user associated with the facility to provide one or more instruction prompts to at least one language learning model (as described in FIG. 3 of the current disclosure). For example, as illustrated in FIG. 5, the user may provide one or more natural language statements to the at least one language learning model. Such statements may correspond to a request to the at least one language learning model to choose a best keyword from a list of keywords, an instruction to provide rationale/reasoning for choosing a particular keyword, a specific formatting in which the user desires a response from the at least one language learning model, an additional prompt to refine a choice of keyword, an acknowledgement for a keyword chosen by the at least one language learning model, a feedback to improve keyword choosing capabilities, and/or the like. Additionally, the user may also provide list of keywords and/or list of labels as illustrated in the exemplary user interface 500. Considering such instruction prompts, the at least one language learning model provides a keyword suitable for labeling unlabeled data as described in FIG. 3 of the current disclosure.

FIG. 6 illustrates a flowchart showing a method described in accordance with one or more example embodiments described herein. In this regard, FIG. 6 illustrates operations that may be performed by the labeling system 300. In some embodiments, the example method 600 defines a computer-implemented process, which may be executable by any of the device(s) and/or system(s) embodied in hardware, software, firmware, and/or a combination thereof, as described herein. In some embodiments, computer program code including one or more computer-coded instructions are stored to at least one non-transitory computer-readable storage medium, such that execution of the computer program code initiates performance of the method 600. At step 602 of the exemplary flowchart 600, the labeling system 300 comprises means such as, the data processing module 302 to retrieve unlabeled data associated with a facility from a database. In this regard, the unlabeled data comprises at least one of: clinical notes, health records, medical literature, description of complaints received from customers associated with the facility, and research findings associated with the facility in the database. At step 604 of the exemplary flowchart 600, the labeling system 300 comprises means such as, the data labeling module 304 to determine one or more parameters in the unlabeled data. This is based on an application of at least one first algorithm on the unlabeled data. At step 606 of the exemplary flowchart 600, the labeling system 300 comprises means such as, the data labeling module 304 to identify one or more topics and one or more clusters in the unlabeled data. This is done by one or more machine learning algorithms using the one or more parameters. At step 608 of the exemplary flowchart 600, the labeling system 300 comprises means such as, the data labeling module 304 to generate a prioritized list of one or more keywords for each of the one or more topics. This is done by the one or more machine learning algorithms. At step 610 of the exemplary flowchart 600, the labeling system 300 comprises means such as, the data labeling module 304 to input the prioritized list of the one or more keywords to at least one language learning model. At step 612 of the exemplary flowchart 600, the labeling system 300 comprises means such as, the data labeling module 304 to output a keyword from the prioritized list of the one or more keywords using the at least one language learning model. At step 614 of the exemplary flowchart 600, the labeling system 300 comprises means such as, the data labeling module 304 to label a cluster of the one or more clusters with the keyword if the keyword meets a predefined threshold. At step 616 of the exemplary flowchart 600, the labeling system 300 comprises means such as, the data labeling module 304 to train a classification model using one or more first labeled clusters. At step 618 of the exemplary flowchart 600, the labeling system 300 comprises means such as, the user interface 306 to render one or more recommendations related to the facility. In this regard, the one or more recommendations are provided by the trained classification model.

Figure 7:
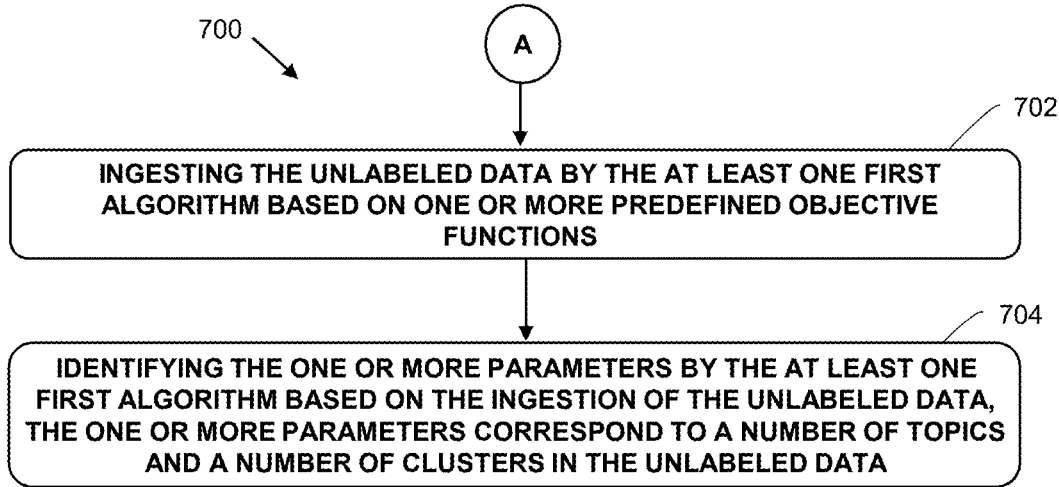
FIG. 7 illustrates a flowchart showing a method described in accordance with one or more example embodiments described herein.

FIG. 7 illustrates a flowchart showing a method described in accordance with one or more example embodiments described herein. In this regard, FIG. 7 illustrates operations that may be performed by the labeling system 300. In some embodiments, the example method 700 defines a computer-implemented process, which may be executable by any of the device(s) and/or system(s) embodied in hardware, software, firmware, and/or a combination thereof, as described herein. In some embodiments, computer program code including one or more computer-coded instructions are stored to at least one non-transitory computer-readable storage medium, such that execution of the computer program code initiates performance of the method 700. At step 702 of the exemplary flowchart 700, the labeling system 300 comprises means such as, the data labeling module 304 to ingest the unlabeled data by the at least one first algorithm based on one or more predefined objective functions. In this regard, the at least one first algorithm corresponds to Bayesian optimization. At step 704 of the exemplary flowchart 700, the labeling system 300 comprises means such as, the data labeling module 304 to identify the one or more parameters by the at least one first algorithm based on the ingestion of the unlabeled data. In this regard, the one or more parameters correspond to a number of topics and a number of clusters in the unlabeled data.

Figure 8:
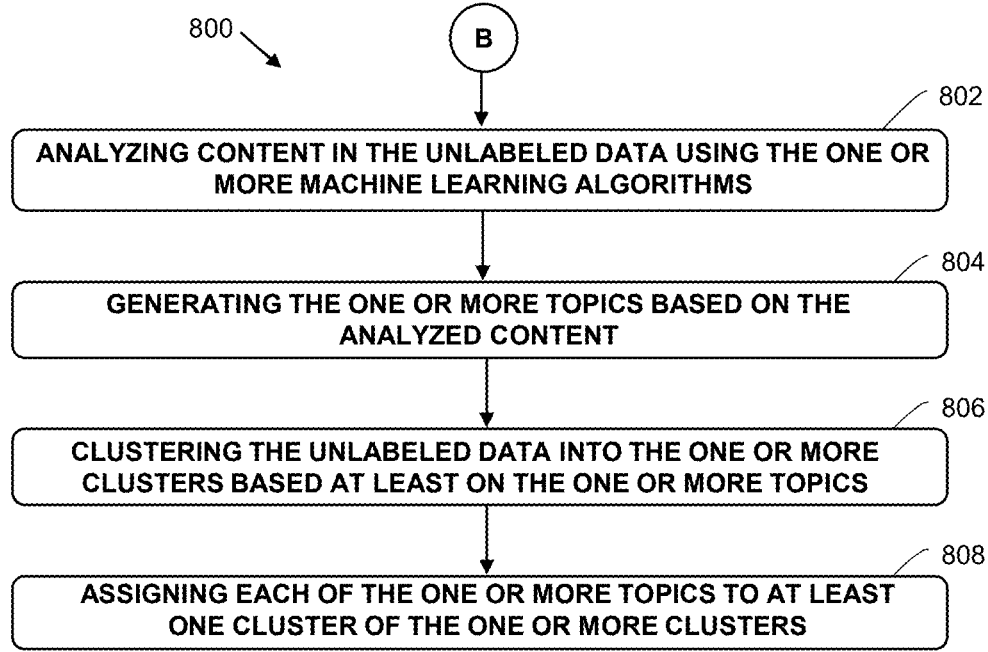
FIG. 8 illustrates a flowchart showing a method described in accordance with one or more example embodiments described herein.

FIG. 8 illustrates a flowchart showing a method described in accordance with one or more example embodiments described herein. In this regard, FIG. 8 illustrates operations that may be performed by the labeling system 300. In some embodiments, the example method 800 defines a computer-implemented process, which may be executable by any of the device(s) and/or system(s) embodied in hardware, software, firmware, and/or a combination thereof, as described herein. In some embodiments, computer program code including one or more computer-coded instructions are stored to at least one non-transitory computer-readable storage medium, such that execution of the computer program code initiates performance of the method 800. At step 802 of the exemplary flowchart 800, the labeling system 300 comprises means such as, the data labeling module 304 to analyze content in the unlabeled data using the one or more machine learning algorithms. In this regard, the one or more machine learning algorithms correspond to topic modeling and clustering algorithms. At step 804 of the exemplary flowchart 800, the labeling system 300 comprises means such as, the data labeling module 304 to generate the one or more topics based on the analyzed content. At step 806 of the exemplary flowchart 800, the labeling system 300 comprises means such as, the data labeling module 304 to cluster the unlabeled data into the one or more clusters based at least on the one or more topics. At step 808 of the exemplary flowchart 800, the labeling system 300 comprises means such as, the data labeling module 304 to assign each of the one or more topics to at least one cluster of the one or more clusters.

Figure 9:
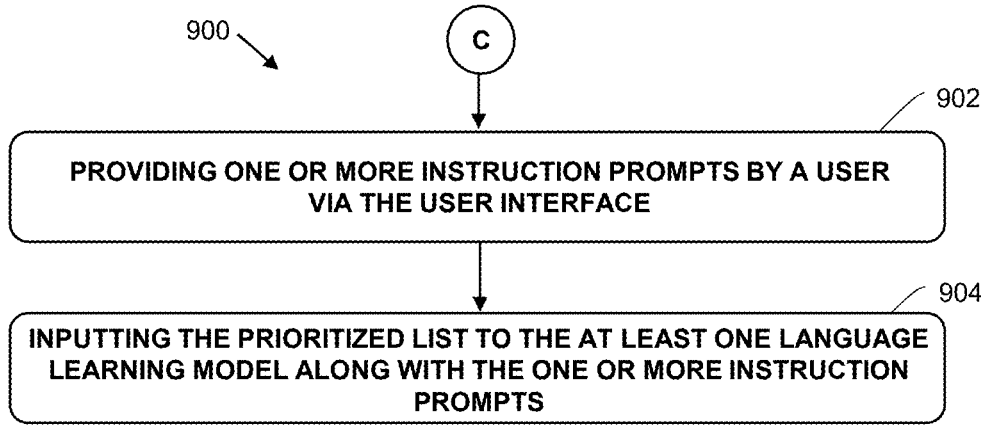
FIG. 9 illustrates a flowchart showing a method described in accordance with one or more example embodiments described herein.

FIG. 9 illustrates a flowchart showing a method described in accordance with one or more example embodiments described herein. In this regard, FIG. 9 illustrates operations that may be performed by the labeling system 300. In some embodiments, the example method 900 defines a computer-implemented process, which may be executable by any of the device(s) and/or system(s) embodied in hardware, software, firmware, and/or a combination thereof, as described herein. In some embodiments, computer program code including one or more computer-coded instructions are stored to at least one non-transitory computer-readable storage medium, such that execution of the computer program code initiates performance of the method 900. At step 902 of the exemplary flowchart 900, the labeling system 300 comprises means such as, the data labeling module 304 that allows a user to provide one or more instruction prompts via the user interface 306. At step 904 of the exemplary flowchart 900, the labeling system 300 comprises means such as, the data labeling module 304 to input the prioritized list to the at least one language learning model along with the one or more instruction prompts.

Figure 10:
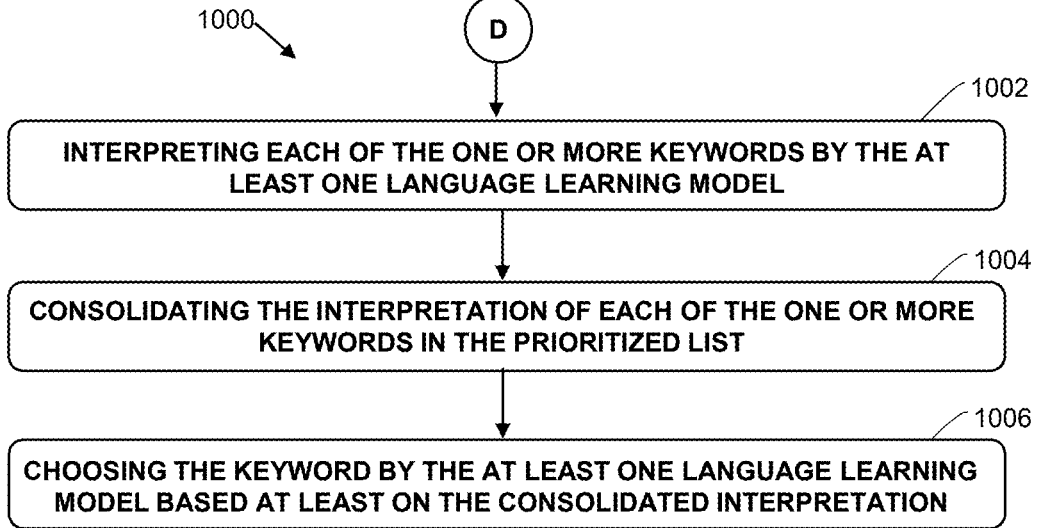
FIG. 10 illustrates a flowchart showing a method described in accordance with one or more example embodiments described herein.

FIG. 10 illustrates a flowchart showing a method described in accordance with one or more example embodiments described herein. In this regard, FIG. 10 illustrates operations that may be performed by the labeling system 300. In some embodiments, the example method 1000 defines a computer-implemented process, which may be executable by any of the device(s) and/or system(s) embodied in hardware, software, firmware, and/or a combination thereof, as described herein. In some embodiments, computer program code including one or more computer-coded instructions are stored to at least one non-transitory computer-readable storage medium, such that execution of the computer program code initiates performance of the method 1000. At step 1002 of the exemplary flowchart 1000, the labeling system 300 comprises means such as, the data labeling module 304 to interpret each of the one or more keywords by the at least one language learning model. At step 1004 of the exemplary flowchart 1000, the labeling system 300 comprises means such as, the data labeling module 304 to consolidate the interpretation of each of the one or more keywords in the prioritized list. At step 1006 of the exemplary flowchart 1000, the labeling system 300 comprises means such as, the data labeling module 304 to choose the keyword by the at least one language learning model based at least on the consolidated interpretation.

Figure 11:
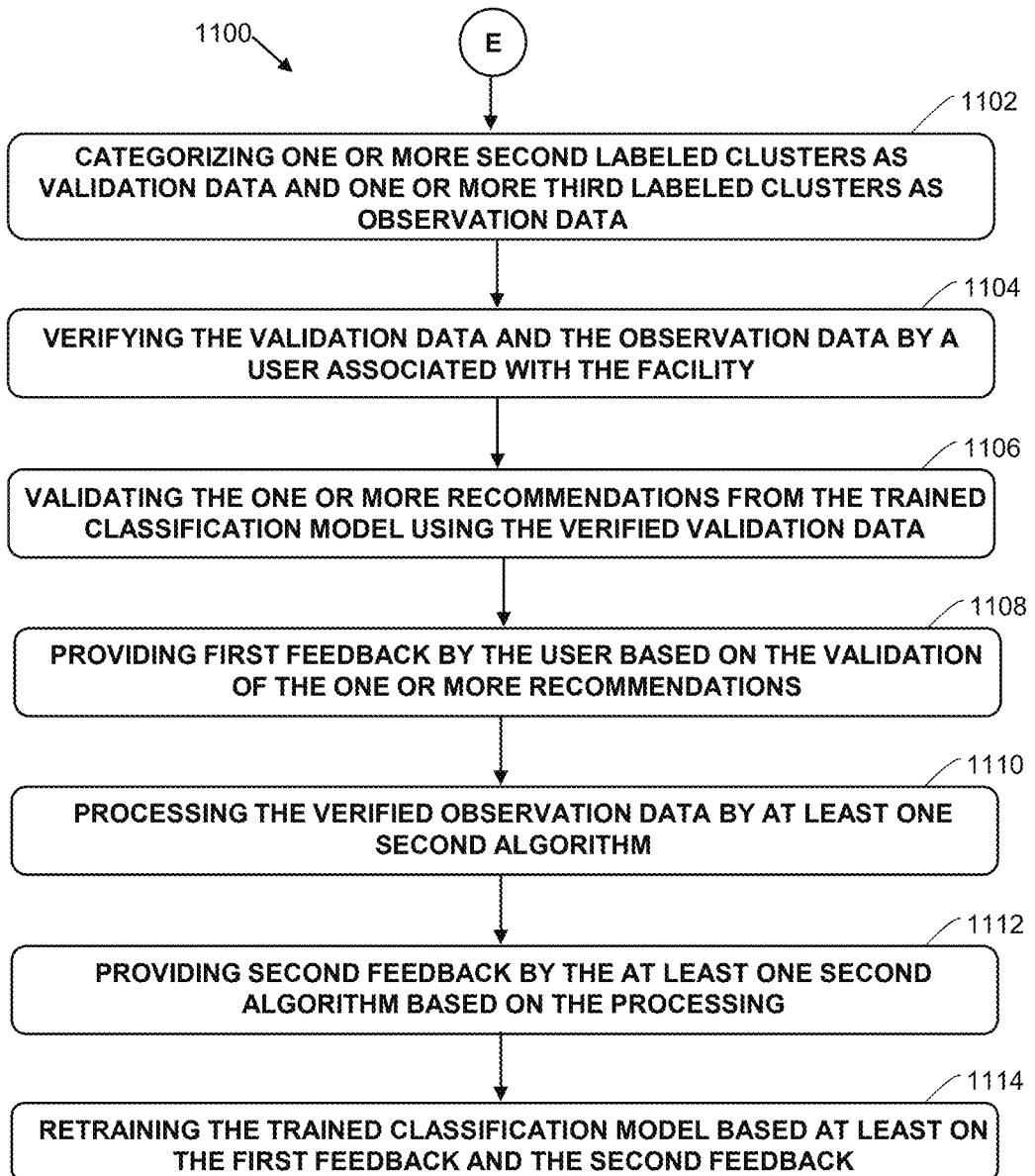
FIG. 11 illustrates a flowchart showing a method described in accordance with one or more example embodiments described herein.

FIG. 11 illustrates a flowchart showing a method described in accordance with one or more example embodiments described herein. In this regard, FIG. 11 illustrates operations that may be performed by the labeling system 300. In some embodiments, the example method 1100 defines a computer-implemented process, which may be executable by any of the device(s) and/or system(s) embodied in hardware, software, firmware, and/or a combination thereof, as described herein. In some embodiments, computer program code including one or more computer-coded instructions are stored to at least one non-transitory computer-readable storage medium, such that execution of the computer program code initiates performance of the method 1100. At step 1102 of the exemplary flowchart 1100, the labeling system 300 comprises means such as, the data labeling module 304 to categorize one or more second labeled clusters as validation data and one or more third labeled clusters as observation data. At step 1104 of the exemplary flowchart 1100, the labeling system 300 comprises means such as, the data labeling module 304 to pass the validation data and the observation data to a user associated with the facility for verification. At step 1106 of the exemplary flowchart 1100, the labeling system 300 comprises means such as, the data labeling module 304 to validate the one or more recommendations from the trained classification model using the verified validation data. At step 1108 of the exemplary flowchart 1100, the labeling system 300 comprises means such as, the data labeling module 304 that allows the user to provide first feedback based on the validation of the one or more recommendations. At step 1110 of the exemplary flowchart 1100, the labeling system 300 comprises means such as, the data labeling module 304 to process the verified observation data by at least one second algorithm. In this regard, the at least one second algorithm corresponds to Bayesian update. At step 1112 of the exemplary flowchart 1100, the labeling system 300 comprises means such as, the data labeling module 304 that allows the at least one second algorithm to provide second feedback based on the processing of the verified observation data. At step 1114 of the exemplary flowchart 1100, the labeling system 300 comprises means such as, the data labeling module 304 to retrain the trained classification model based at least on the first feedback and the second feedback.

The foregoing embodiments are provided merely as illustrative examples and are not intended to require or imply that the steps of the various embodiments must be performed in the order presented. As will be appreciated by one of skill in the art the order of steps in the foregoing embodiments can be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

It is to be appreciated that 'one or more' includes a function being performed by one element, a function being performed by more than one element, e.g., in a distributed fashion, several functions being performed by one element, several functions being performed by several elements, or any combination of the above.

Moreover, it will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

The hardware used to implement the various illustrative logics, logical blocks, modules, and circuits described in connection with the aspects disclosed herein can include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor can be a microprocessor, but, in the alternative, the processor can be any processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Alternatively, or in addition, some steps or methods can be performed by circuitry that is specific to a given function.

In one or more example embodiments, the functions described herein can be implemented by special-purpose hardware or a combination of hardware programmed by firmware or other software. In implementations relying on firmware or other software, the functions can be performed as a result of execution of one or more instructions stored on one or more non-transitory computer-readable media and/or one or more non-transitory processor-readable media. These instructions can be embodied by one or more processor-executable software modules that reside on the one or more non-transitory computer-readable or processor-readable storage media. Non-transitory computer-readable or processor-readable storage media can in this regard comprise any storage media that can be accessed by a computer or a processor. By way of example but not limitation, such non-transitory computer-readable or processor-readable media can include random access memory (RAM), read-only memory (ROM), electrically erasable programmable read-only memory (EEPROM), FLASH memory, disk storage, magnetic storage devices, or the like. Disk storage, as used herein, includes compact disc (CD), laser disc, optical disc, digital versatile disc (DVD), floppy disk, and Blu-ray disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media can be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components can be used in conjunction with the supply management system. Therefore, it is to be understood that the inventions are not to be limited to the specific embodiments disclosed and that modifications and other embodiments are intended to be included within the scope of the appended claims. Moreover, the steps in the method described above can not necessarily occur in the order depicted in the accompanying diagrams, and in some cases one or more of the steps depicted can occur substantially simultaneously, or additional steps can be involved. Although specific terms are employed herein, they are used in a generic and descriptive sense only and not for purposes of limitation. It is intended that the specification and examples be considered as exemplary only, with a true scope and spirit of the disclosure being indicated by the following claims.

The invention claimed is:

1. A method for constructing a classification model using data associated with a facility, the method comprising:
    retrieving from a database unlabeled data associated with the facility;
    determining one or more parameters in the unlabeled data based on an application of at least one first algorithm on the unlabeled data;
    identifying one or more topics and one or more clusters in the unlabeled data by one or more machine learning algorithms using the one or more parameters;
    generating a prioritized list of one or more keywords for each of the one or more topics by the one or more machine learning algorithms;
    inputting the prioritized list of the one or more keywords to at least one language learning model;
    outputting, by the at least one language learning model, a keyword from the prioritized list of the one or more keywords based on one or more instruction prompts from a user;
    labeling a cluster of the one or more clusters with the keyword if the keyword meets a predefined threshold;
    training the classification model using one or more first labeled clusters; and
    rendering via a user interface, one or more recommendations related to the facility, wherein the one or more recommendations are provided by the trained classification model.

2. The method of claim 1, wherein retrieving the unlabeled data comprises retrieving at least one of: clinical notes, health records, medical literature, description of complaints received from customers associated with the facility, and research findings associated with the facility from the database.

3. The method of claim 1, wherein determining the one or more parameters in the unlabeled data comprises:
    ingesting the unlabeled data by the at least one first algorithm based on one or more predefined objective functions, wherein the at least one first algorithm corresponds to Bayesian optimization; and
    identifying the one or more parameters by the at least one first algorithm based on the ingestion of the unlabeled data, wherein the one or more parameters correspond to a number of topics and a number of clusters in the unlabeled data.

4. The method of claim 1, wherein identifying the one or more topics and the one or more clusters by the one or more machine learning algorithms comprises:
    analyzing content in the unlabeled data using the one or more machine learning algorithms, wherein the one or more machine learning algorithms correspond to topic modeling and clustering algorithms;
    generating the one or more topics based on the analyzed content;
    clustering the unlabeled data into the one or more clusters based at least on the one or more topics; and
    assigning each of the one or more topics to at least one cluster of the one or more clusters.

5. The method of claim 1, wherein inputting the prioritized list of the one or more keywords comprises:
    providing the one or more instruction prompts by the user via the user interface; and inputting the prioritized list to the at least one language learning model along with the one or more instruction prompts.

6. The method of claim 1, wherein outputting the keyword from the prioritized list comprises:
    interpreting each of the one or more keywords by the at least one language learning model;
    consolidating the interpretation of each of the one or more keywords in the prioritized list; and
    choosing the keyword by the at least one language learning model based at least on the consolidated interpretation.

7. The method of claim 1, further comprising:
    categorizing one or more second labeled clusters as validation data and one or more third labeled clusters as observation data;
    verifying the validation data and the observation data by a user associated with the facility;
    validating the one or more recommendations from the trained classification model using the verified validation data;
    providing first feedback by the user based on the validation of the one or more recommendations;
    processing the verified observation data by at least one second algorithm, wherein the at least one second algorithm corresponds to Bayesian update;
    providing second feedback by the at least one second algorithm based on the processing; and
    retraining the trained classification model based at least on the first feedback and the second feedback.

8. A system for constructing a classification model using data associated with a facility, the system comprising:
    a processor;
    a memory communicatively coupled to the processor, wherein the memory comprises one or more instructions which when executed by the processor, cause the processor to:
    retrieve from a database unlabeled data associated with the facility;
    determine one or more parameters in the unlabeled data based on an application of at least one first algorithm on the unlabeled data;
    identify one or more topics and one or more clusters in the unlabeled data by one or more machine learning algorithms using the one or more parameters;
    generate a prioritized list of one or more keywords for each of the one or more topics by the one or more machine learning algorithms;
    input the prioritized list of the one or more keywords to at least one language learning model;
    output, by the at least one language learning model, a keyword from the prioritized list of the one or more keywords based on one or more instruction prompts from a user;
    label a cluster of the one or more clusters with the keyword if the keyword meets a predefined threshold;
    train the classification model using one or more first labeled clusters; and
    render via a user interface, one or more recommendations related to the facility, wherein the one or more recommendations are provided by the trained classification model.

9. The system of claim 8, wherein the processor is further configured to retrieve at least one of: clinical notes, health records, medical literature, description of complaints received from customers associated with the facility, and research findings associated with the facility from the database.

10. The system of claim 8, wherein the processor is further configured to:

ingest the unlabeled data by the at least one first algorithm based on one or more predefined objective functions, wherein the at least one first algorithm corresponds to Bayesian optimization; and identify the one or more parameters by the at least one first algorithm based on the ingestion of the unlabeled data, wherein the one or more parameters correspond to a number of topics and a number of clusters in the unlabeled data.

11. The system of claim 8, wherein the processor is further configured to:

analyze content in the unlabeled data using the one or more machine learning algorithms, wherein the one or more machine learning algorithms correspond to topic modeling and clustering algorithms;

generate the one or more topics based on the analyzed content;

cluster the unlabeled data into the one or more clusters based at least on the one or more topics; and assign each of the one or more topics to at least one cluster of the one or more clusters.

12. The system of claim 8, wherein the processor is further configured to:

receive the one or more instruction prompts by the user via the user interface; and input the prioritized list to the at least one language learning model along with the one or more instruction prompts.

13. The system of claim 8, wherein the processor is further configured to:

interpret each of the one or more keywords by the at least one language learning model;

consolidate the interpretation of each of the one or more keywords in the prioritized list; and choose the keyword by the at least one language learning model based at least on the consolidated interpretation.

14. The system of claim 8, wherein the processor is further configured to:

categorize one or more second labeled clusters as validation data and one or more third labeled clusters as observation data;

verify the validation data and the observation data by a user associated with the facility;

validate the one or more recommendations from the trained classification model using the verified validation data;

provide first feedback by the user based on the validation of the one or more recommendations;

process the verified observation data by at least one second algorithm, wherein the at least one second algorithm corresponds to Bayesian update;

provide second feedback by the at least one second algorithm based on the processing; and retrain the trained classification model based at least on the first feedback and the second feedback.

15. A non-transitory, computer-readable storage medium having stored thereon executable instructions that, when executed by one or more processors, cause the one or more processors to:

retrieve from a database unlabeled data associated with a facility;

determine one or more parameters in the unlabeled data based on an application of at least one first algorithm on the unlabeled data;

identify one or more topics and one or more clusters in the unlabeled data by one or more machine learning algorithms using the one or more parameters;

generate a prioritized list of one or more keywords for each of the one or more topics by the one or more machine learning algorithms;

input the prioritized list of the one or more keywords to at least one language learning model;

output, by the at least one language learning model, a keyword from the prioritized list of the one or more keywords based on one or more instruction prompts from a user;

label a cluster of the one or more clusters with the keyword if the keyword meets a predefined threshold;

train a classification model using one or more first labeled clusters; and render via a user interface, one or more recommendations related to the facility, wherein the one or more recommendations are provided by the trained classification model.

16. The non-transitory, computer-readable storage medium of claim 15, wherein the one or more processors is further configured to:

ingest the unlabeled data by the at least one first algorithm based on one or more predefined objective functions, wherein the at least one first algorithm corresponds to Bayesian optimization; and identify the one or more parameters by the at least one first algorithm based on the ingestion of the unlabeled data, wherein the one or more parameters correspond to a number of topics and a number of clusters in the unlabeled data.

17. The non-transitory, computer-readable storage medium of claim 15, wherein the one or more processors is further configured to:

analyze content in the unlabeled data using the one or more machine learning algorithms, wherein the one or more machine learning algorithms correspond to topic modeling and clustering algorithms;

generate the one or more topics based on the analyzed content;

cluster the unlabeled data into the one or more clusters based at least on the one or more topics; and assign each of the one or more topics to at least one cluster of the one or more clusters.

18. The non-transitory, computer-readable storage medium of claim 15, wherein the one or more processors is further configured to:

receive the one or more instruction prompts by the user via the user interface; and input the prioritized list to the at least one language learning model along with the one or more instruction prompts.

19. The non-transitory, computer-readable storage medium of claim 15, wherein the one or more processors is further configured to:

interpret each of the one or more keywords by the at least one language learning model;

consolidate the interpretation of each of the one or more keywords in the prioritized list; and choose the keyword by the at least one language learning model based at least on the consolidated interpretation.

20. The non-transitory, computer-readable storage medium of claim 15, wherein the one or more processors is further configured to:

categorize one or more second labeled clusters as validation data and one or more third labeled clusters as observation data;

verify the validation data and the observation data by a user associated with the facility;

validate the one or more recommendations from the trained classification model using the verified validation data;

provide first feedback by the user based on the validation of the one or more recommendations;

process the verified observation data by at least one second algorithm, wherein the at least one second algorithm corresponds to Bayesian update;

provide second feedback by the at least one second algorithm based on the processing; and retrain the trained classification model based at least on the first feedback and the second feedback.

* * * * *